US006423779B2

(12) United States Patent
Sue et al.

(10) Patent No.: US 6,423,779 B2
(45) Date of Patent: *Jul. 23, 2002

(54) METHOD FOR IMPROVING THE IMPACT RESISTANCE AND SCRATCH RESISTANCE OF POLYMERIC SYSTEMS

(75) Inventors: H. J. Sue; G-X Wei, both of College Station, TX (US)

(73) Assignee: The Texas A&M University System, College Station, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/933,942

(22) Filed: Aug. 21, 2001

Related U.S. Application Data

(62) Division of application No. 09/392,231, filed on Sep. 8, 1999, now Pat. No. 6,300,417.
(60) Provisional application No. 60/113,789, filed on Dec. 22, 1998.

(51) Int. Cl.[7] ........................... C08L 9/00; C08L 23/00; C08L 23/04; C08L 25/02
(52) U.S. Cl. ....................... 525/191; 525/232; 525/240; 525/241
(58) Field of Search ................................ 525/191, 232, 525/240, 241

(56) References Cited

U.S. PATENT DOCUMENTS

| 4,764,559 A | 8/1988 | Yamauchi et al. | |
|---|---|---|---|
| 4,892,904 A | 1/1990 | Ting | |
| 6,300,417 B1 | * 10/2001 | Sue et al. ................ | 525/191 |

FOREIGN PATENT DOCUMENTS

| EP | 0 115 712 | 8/1984 |
|---|---|---|
| EP | 0 326 895 | 1/1989 |
| JP | 7-165998 | 6/1995 |

OTHER PUBLICATIONS

M.K. Akkapeddi and B. VanBuskirk, "Compatibilization and Toughening of PPE–PP Blends with Hydrogenated, Styrene–Diene Block Copolymers", Advances in Polymer Technology, vol. 11, No. 4, 263–275 (1992); 1992 by John Wiley & Sons, Inc.
H.J. Sue, A.F. Yee, "Failure Mechanisms in Alloy of Polyamide 6,6/Polyphenylene Oxide Under Severe Conditions", Journal of Materials Science 26 (1991), 3449–3456.

Hung–Jue Sue, Albert F. Yee, "Toughening Mechanisms in a Multi–Phase Alloy of Nylon 6,6/Polyphenylene Oxide", Journal of Materials Science 24 (1989), 1447–1457.
Hung–Jue Sue and Albert F. Yee, "Toughening Mechanism(s) in Rigid–Polymer Alloys", Macromolecular Research Center and Department of Materials Science and Engineering University of Michigan, 396–403, Aug. 1987.
J. Chu, L. Rumao and B. Coleman, "Scratch and Mar Resistance of Filled Polypropylene Materials", Polymer Engineering and Science, Nov. 1998, vol. 38, No. 11, 1906–1914, 1995.
J.L. Way, J.R. Atkinson, "Some Studies of Deformation Processes in Fully–Spherulitic Polypropylene", Journal of Materials Science 6 (1971), 102–109.
H.J. Sue, R.A. Pearson and A.F. Yee, "Mechanical Modeling of Initiation of Localized Yielding Under Plane Stress Conditions in Rigid–Rigid Polymer Alloys", Polymer Engineering and Science, Mid–Jun. 1991, vol. 31, No. 11, 793–802.
R.J.M. Borggreve, R.J. Gaymans, J. Schuijer and J.F. Ingen Housz, "Brittle–Tough Transition in Nylon Rubber Blends: Effect of Rubber Concentration and Particle Size", Polymer, 1987, vol. 28, 1489–1496.
A. Lustiger, C.N. Marzinsky and R.R. Mueller, "Spherulite Boundary Strengthening Concept for Toughening Polypropylene", Journal of Polymer Science, vol. 36, 2047–2056 (1998), 2047–2056.
H. Breuer, F. Haaf and J. Stabenow, "Stress Whitening and Yielding Mechanism of Rubber–Modified PVC", J. Macromol. Sci–Phys., B14(3), (1977), 387–417.
A.S. Holik, R.P. Kambour, D.G. Fink and S.Y. Hobbs, "Grinding and Polishing Techniques for Thin Sectioning of Polymeric Materials for Transmission Light Microscopy", Le May, Fallon, McCall, eds. Microstructural Science, vol. 7, (1979), 357–367.

* cited by examiner

Primary Examiner—Nathan M. Nutter
(74) Attorney, Agent, or Firm—Baker Botts L.L.P.

(57) ABSTRACT

A method includes providing a starting material having a Young's modulus (202). Second, from a plurality of possible modifiers, a modifier is identified and selected that has a Young's modulus comparable to or greater than that of the starting material and that, when blended with the starting material, creates a blend with a stable morphology (204). Third, the scratch resistance of the starting material is increased by blending the modifier with the starting material to form a blend (206). Alternatively, the scratch resistance of the stating material is maintained while the toughness of the starting material is increased by blending the modifier with the starting material to form a blend.

24 Claims, 2 Drawing Sheets

METHOD FOR IMPROVING THE IMPACT RESISTANCE AND SCRATCH RESISTANCE OF POLYMERIC SYSTEMS

RELATED APPLICATION

This application is a continuation of U.S. patent application Ser. No. 09/392,231 filed Sep. 8, 1999, now U.S. Pat. No. 6,300,417, which claimed the benefit of U.S. Provisional Application Ser. No. 60/113,789, filed Dec. 22, 1998, entitled IMPACT/SCRATCH RESISTANT THERMOPLASTIC OLEFINS USING RIGID-RIGID POLYMER TOUGHENING, which is hereby incorporated by reference.

TECHNICAL FIELD OF THE INVENTION

This invention relates generally to the field of polymeric systems and more specifically to a method for improving the impact resistance and scratch resistance of polymeric systems.

BACKGROUND OF THE INVENTION

The increasing market demand for structural applications of polymeric systems has dramatically heightened the importance of impact resistant and scratch resistant polymeric systems. For example, the automotive industry utilizes polymeric systems in the fabrication of automobile bumpers and fenders, which require both high impact resistance and high scratch resistance. Improving the impact resistance of a polymeric system, however, generally reduces the scratch resistance. Moreover, improving the scratch resistance generally reduces impact resistance. Known methods have been unsuccessful in improving both the impact and scratch resistance of polymeric systems.

Known methods of improving the impact resistance and scratch resistance of polymeric systems utilize additives and fillers to improve performance. In one type of method, rubber may be added as a toughener to improve the impact resistance of a polymeric system. The addition of rubber, however, typically reduces scratch resistance. Moreover, the addition of inorganic fillers has failed to increase the scratch resistance. In another type of method, rigid polymers are blended together to improve toughness. Blending randomly chosen rigid polymers, however, usually results in blends with unpredictable properties. Moreover, known rigid-rigid polymer blends do not exhibit satisfactory toughness.

While these approaches have provided improvements over prior approaches, the challenges in the field of polymeric systems have continued to increase with demands for more effective techniques. Therefore, a need has arisen for a new method for improving the impact resistance and scratch resistance of polymeric systems.

SUMMARY OF THE INVENTION

In accordance with the present invention, a method for improving the impact resistance and scratch resistance of polymeric systems is provided that substantially eliminates or reduces the disadvantages and problems associated with previously developed methods.

According to one embodiment of the invention, a method is disclosed. First, a starting material having a Young's modulus is provided. Second, from a plurality of possible modifiers, a modifier is identified and selected that has a Young's modulus comparable to or greater than that of the starting material and that, when blended with the starting material, creates a blend with a stable morphology. Third, the scratch resistance of the starting material is increased by blending the modifier with the starting material to form a blend.

According to another embodiment of the invention, a method for increasing the impact resistance and scratch resistance of a starting material is disclosed. First, a starting material having a Young's modulus is provided. Second, a modifier having a Young's modulus comparable to or greater than that of the starting material is provided. Third, the scratch resistance of the starting material is increased by blending the modifier with the starting material to form a blend, the modifier being operable to create a blend with a stable morphology, to remain in a dispersed phase of the blend, and to trigger crazing or shear banding in the blend. Fourth, a compatibilizer is added to the blend, wherein the compatibilizer is operable to increase the particle dispersion and interfacial adhesion of the blend.

According to yet another embodiment of the invention, a method for increasing the impact resistance and scratch resistance of a starting material is disclosed. First, a starting material comprising polypropylene is provided. Second, a modifier comprising NORYL-PX0844 is provided. Third, the scratch resistance of the starting material is increased by blending the modifier with the starting material to form a blend.

According to another embodiment of the invention, a method for maintaining the scratch resistance of a starting material while increasing the toughness of the starting material is disclosed. First, a starting material having a Young's modulus is provided. Second, a modifier having a Young's modulus comparable to or greater than that of the starting material is provided. Third, the scratch resistance of the starting material is maintained and the toughness of the starting material is increased by blending the modifier with the starting material to form a blend, the modifier being operable to create a blend with a stable morphology, to remain in a dispersed phase of the blend, and to trigger crazing or shear banding in the blend. Fourth, a compatibilizer is added to the blend, wherein the compatibilizer is operable to increase the particle dispersion and interfacial adhesion of the blend.

A technical advantage of the present invention is that the modifier improves both the impact and the scratch resistance of a polymeric system. Alternatively, the modifier maintains the scratch resistance of a polymeric system while increasing the toughness of the polymeric system. Another technical advantage of the present invention is that the compatibilizer improves the miscibility between the modifier and the polymeric system, enhancing the toughness of the system. These technical advantages dramatically increase the quality of polymeric systems as used in many structural applications, for example, the fabrication of automobile bumpers and interior instrument panels.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

An embodiment of the present invention and its advantages are best understood by referring to FIGS. 1–4 of the drawings, like numerals being used for like and corresponding parts of the various drawings.

Figure 1:
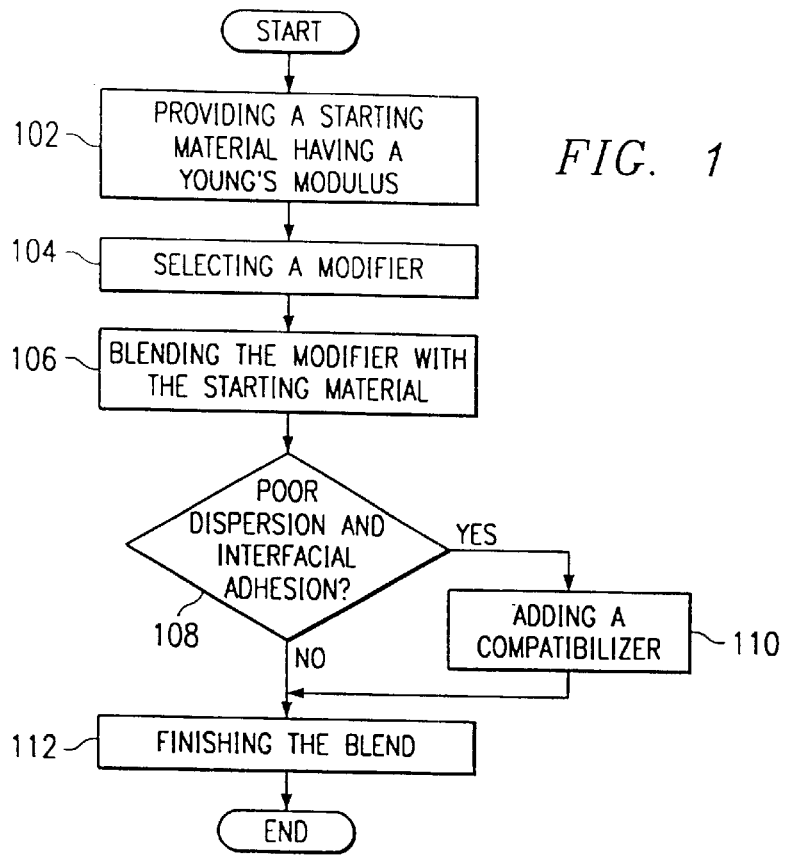
FIG. 1 is a flowchart illustrating a method of improving the impact resistance and scratch resistance of a polymeric system in accordance with the present invention.

FIG. 1 is a flowchart illustrating one method of improving the impact resistance and scratch resistance of a polymeric system in accordance with the present invention. The method starts with step 102, where a starting material with a Young's modulus is provided. The Young's modulus for the starting material may be determined experimentally according to ASTM standards or estimated based on values provided in *Modern Plastics Encyclopedia,* by Modem Plastics, which is published by McGraw Hill. The starting material is a material that will have its impact and scratch resistance increased. The starting material may comprise, for example, a polymeric system, that is, a system comprising polymer, such as a polypropylene. Other suitable polymers include polycarbonate, nylon, and polybutylene terephthalate. The method then proceeds to step 104, where a modifier is selected. A modifier, in general, is an additive used to improve the impact and scratch resistance of a starting material. The modifier is generally a polymer having characteristics described below; however, a suitable inorganic filler may be used in combination with polymers as a modifier. The modifier is selected to have a comparable or greater Young's modulus than that of the starting material. The modifier may increase the Young's modulus of the resulting blend, which may contribute to scratch resistance. An advantageous characteristic of the modifier is that, when blended with the starting material, the resulting blend exhibits a stable morphology. A blend with a stable morphology is stable under a variety of processing conditions. Another advantageous characteristic of the modifier is the ability to remain in the dispersed phase of the blend. In one embodiment, the modifier triggers massive crazing or shear banding in the starting material to improve toughness. Formation of massive crazing and shear banding dissipates fracture energy, reducing the possibility of cracking. Additionally, the modifier may be selected to produce a blend that exhibits a high shear modulus and a high surface ductility. In the context of automotive applications, a high shear modulus refers to a shear modulus of 0.6 GPa or higher. A high surface ductility refers to a material that frails in a ductile manner rather than a brittle manner. The modifier may comprise, for example, a rigid polymer such as the one sold under the trademark NORYL-PX0844 by G. E. Plastics. NORYL-PX0844 comprises polyphenylene oxide, polystyrene, and rubber.

The method then proceeds to step 106, where the scratch resistance of the starting material is increased by blending the starting material with a modifier to form a blend. The blend may comprise, for example, approximately ten to forty-five percent modifier by weight. A blend comprising, for example, approximately ten to twenty percent modifier by weight may be particularly advantageous to achieve. The blend may be prepared using a research grade roll milling machine; other suitable methods, however, also may be used such as extrusion or injection molding. The method then proceeds to step 108, where the dispersion and the proper interfacial adhesion of the blend is determined. The starting material and the modifier may be immiscible in each other due to differences in their polarity and solubility parameters. If the blend exhibits satisfactory dispersion and interfacial adhesion properties, the method proceeds to step 112, where a finishing process takes place. In step 112, the blend may be compression molded into sheets at approximately 200° C., extruded, or injection molded.

If, in step 108, the dispersion and the interfacial adhesion is determined to be poor, the method proceeds to step 110, where a compatibilizer is added to the blend. A compatibilizer is, in general, an additive used to improve the compatibility between components. The blend may comprise, for example, approximately 0.5 to ten percent compatibilizer by weight. A blend of approximately two to five percent compatibilizer by weight may be particularly advantageous to achieve. The compatibilizer may comprise, for example, a low molecular weight compound, a diblock copolymer, a triblock copolymer, or a random copolymer. The compatibilizer may comprise, for example, a styrene-ethylene-propylene diblock copolymer. The compatibilizer has, in general, the ability to generate chemical or physical bonding to the polymer components to be compatibilized, improving miscibility. After addition of the compatibilizer, step 108 may be repeated (not explicitly shown) to determine if the compatibilizer was effective. If not, an alternative compatibilizer may be used. The method then proceeds to step 112, where the finishing process takes place. After the finishing process, the method terminates.

By adding a modifier and a compatibilizer, the present invention achieves both impact and scratch resistance in a polymeric system. The addition of a suitable modifier increases the Young's modulus of the polymeric system and creates a blend with a stable morphology, contributing to scratch resistance. Moreover, the addition of a compatibilizer improves particle dispersion and interfacial adhesion, resulting in enhanced toughness. Consequently, the present invention increases the range of polymer systems which exhibit both high impact resistance and high scratch resistance, thereby expanding the scope of suitable materials available for industrial application in industries such as the automotive industry. Alternatively, the method may also be used to maintain the scratch resistance of a polymeric system while increasing the toughness of the polymeric system.

Figure 2:
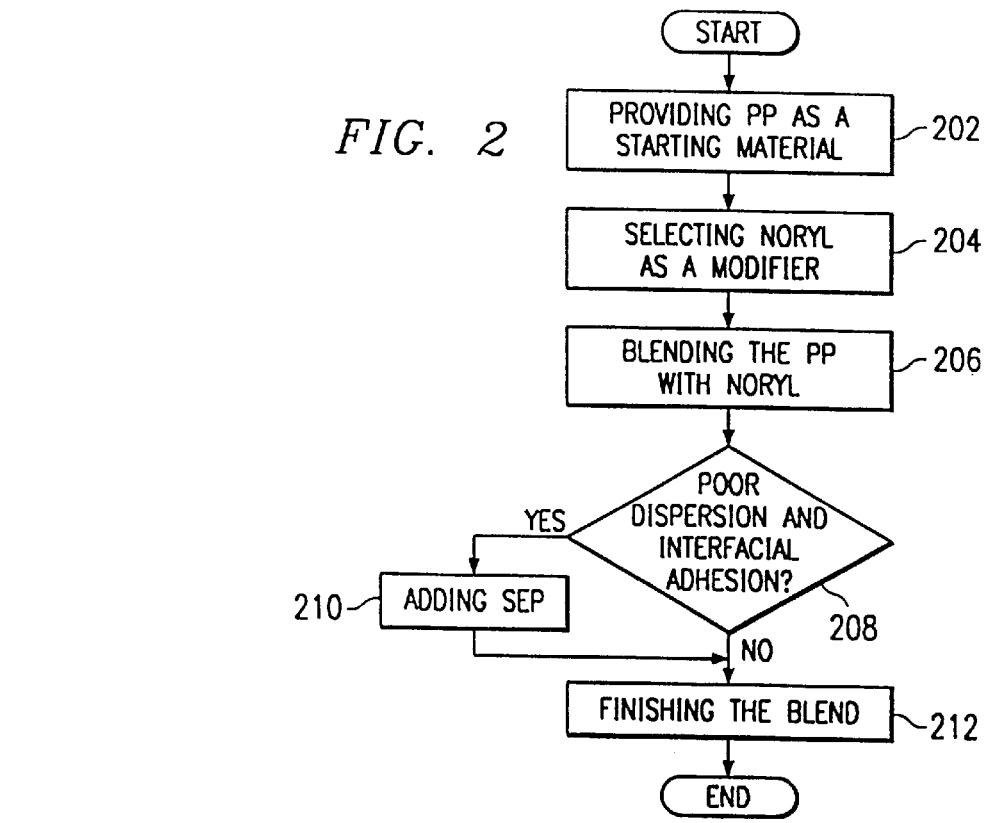
FIG. 2 is a flowchart illustrating a method of improving the impact resistance and scratch resistance of a polypropylene in accordance with the present invention.

FIG. 2 is a flowchart illustrating one method of improving the impact resistance and scratch resistance of a polypropylene (PP) in accordance with the present invention. The method starts with step 202, where a starting material, which in this example is polypropylene, with a Young's modulus is provided. The Young's modulus may be determined as described above in conjunction with FIG. 1. The method then proceeds to step 204, where a modifier used to improve the impact and scratch resistance of the polypropylene is selected. The Young's modulus for the modifier will be higher than Young's modulus for the polypropylene. In this embodiment, the modifier comprises NORYL-PX0844. NORYL-PX0844 comprises polyphenylene oxide, polystyrene, and rubber.

The method then proceeds to step 206, where the polypropylene is blended with the modifier. In one example, the blend contains approximately 90% polypropylene and 10% modifier by weight; however, other proportions, for example, approximately ten to forty-five percent modifier by weight, may be used. The blend may be prepared using a research grade roll milling machine at a roll temperature of approximately 190–200° C., or other suitable method, such as extrusion or injection molding. The method then proceeds to step 208, where the dispersion and the interfacial adhesion of the blend is determined. If at step 208, the blend exhibits satisfactory dispersion and interfacial adhesion properties, the method proceeds to step 212, where a finishing process takes place. In step 212, the blend may be compression molded into thin sheets at approximately 190–200° C. After the finishing process, the method terminates.

If the dispersion and the interfacial adhesion are poor or further improvement is needed, the method proceeds to step 210, where a compatibilizer is added to the blend. The compatibilizer may comprise, for example, a styrene-ethylene-propylene (SEP) diblock copolymer. For example, an SEP diblock copolymer comprising an EP block with a transition glass temperature of approximately −58° C. and a styrene block with a transition glass temperature of approximately 95° C. may be used. The blend may comprise, for example, approximately 0.5 to ten percent compatibilizer by weight. In one example, the compatibilizer is added such that the resulting blend comprises approximately 88% PP, 10% NORYL-PX0844, and 2% SEP by weight; however, other proportions may be used, for example, approximately 85% PP, 10% NORYL-PX0844, and 5% SEP by weight. The method then proceeds to step 112, where the finishing process takes place, and then terminates.

The method described in connection with FIG. 2 yields a polymeric system with improved impact and scratch resistance, as shown by the following experimental data. To prepare the specimens for testing, the PP/10% NORYL-PX0844 and PP/10% NORYL-PX0844/5% SEP blends were compression molded into thin sheets (4 mm thick) at 200° C. To obtain tensile properties, tensile specimens were cut from the compression molded plaques and machined to the required dimensions designated by ASTM D-638. For toughness measurements, single-notch three-point bend specimens were cut from the compression molded plaques and were machined to form bars with dimensions 63.5 mm×12.7 mm×4 mm. The bars were notched with a notch cutter with a 250 μm radius to a depth of 5.5 mm. A liquid nitrogen-chilled razor blade was used to open a sharp crack with a depth of about 6.4 mm. For damage testing, double-notch four-point-bend specimens, with dimensions 120 mm×12.7 mm×4 mm, were prepared to generate a sub-critically propagated crack.

The $J_C$ values, the critical energy release rates of crack growth, indicate toughness. These values were measured using a screw-driven mechanical testing machine at a displacement rate of 2 mm/min. During testing, the specimens were loaded to different predetermined deflections, and load-displacement curves were computed. After unloading, each specimen was immersed in liquid nitrogen for 3 minutes and then broken. The extent of crack growth was measured from the fracture surface. The J-integral value was calculated using the following expression:

$$J = \frac{2U}{B(W-a)}$$

where U is the input energy to specimen given by the area under the load-displacement curve, B is the thickness of specimen, C is the width of specimen, and a is the crack length. Calculated J values were then plotted against the crack length, Δa, to obtain a J-R curve. A blunting line was calculated for J=2σ_yΔa, where σ_y=yield stress. The $J_C$ values were determined at the point of intersection between the J-R curve and the blunting line.

Figure 3:
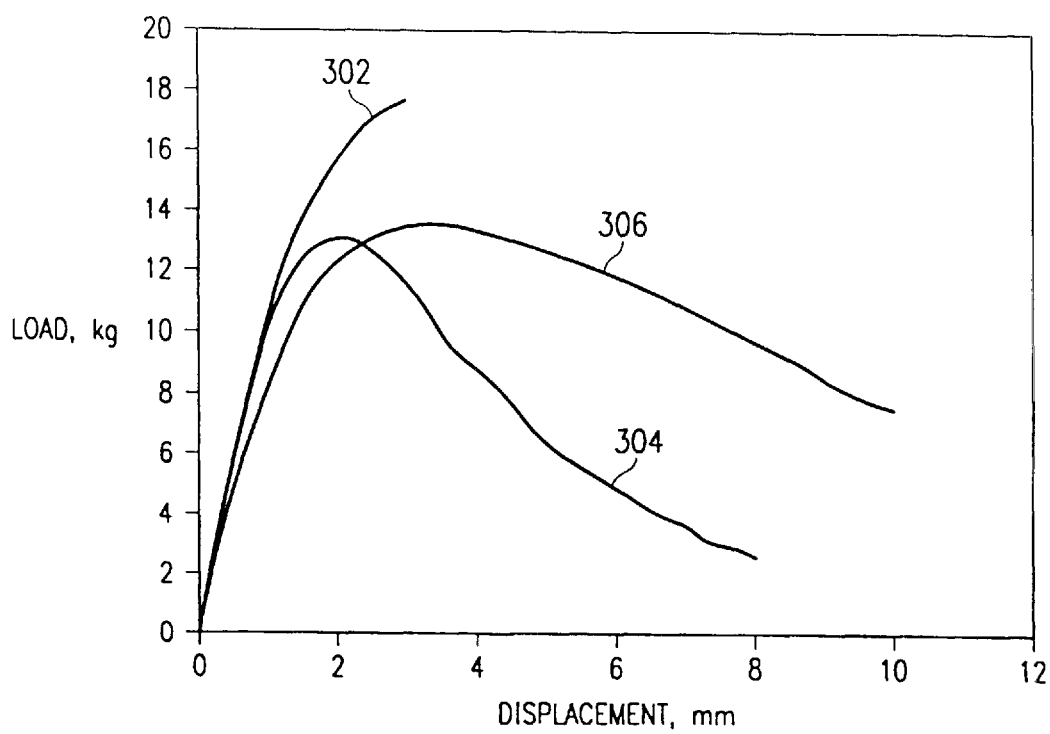
FIG. 3 is a graph illustrating the load-displacement curves of polypropylene modified in accordance with one embodiment of the present invention.

The experimental data revealed that the addition of NORYL-PX0844 improved both the toughness and the scratch resistance and that further addition of SEP increased the toughness of the PP/NORYL-PX0844 blend significantly, with only a small drop in modulus. FIG. 3 is a graph illustrating the load-displacement (P-d) curves of polypropylene modified in accordance with one embodiment of the present invention. The load-displacement curves were measured using a screw-driven mechanical testing machine at a displacement rate of 2 mm/min. During testing, the specimens were loaded to different predetermined deflections, and the load-displacement curves were computed. The graph shows the load as a function of displacement, where the load (kg) is indicated on the y-axis, and the displacement (mm) is indicated on the x-axis. The load The load-displacement curve for the neat PP 302 indicates a brittle material with no sign of plasticity. The addition of 10% by weight of NORYL-PX0844 yielded a blend with a pronounced non-linear P-d curve 304 indicating plastic deformation. The PP/NORYL-PX0844/SEP blend yielded a non-linear P-d curve 306 indicating more stable crack growth; no unstable fractures occurred in this blend.

Figure 4:
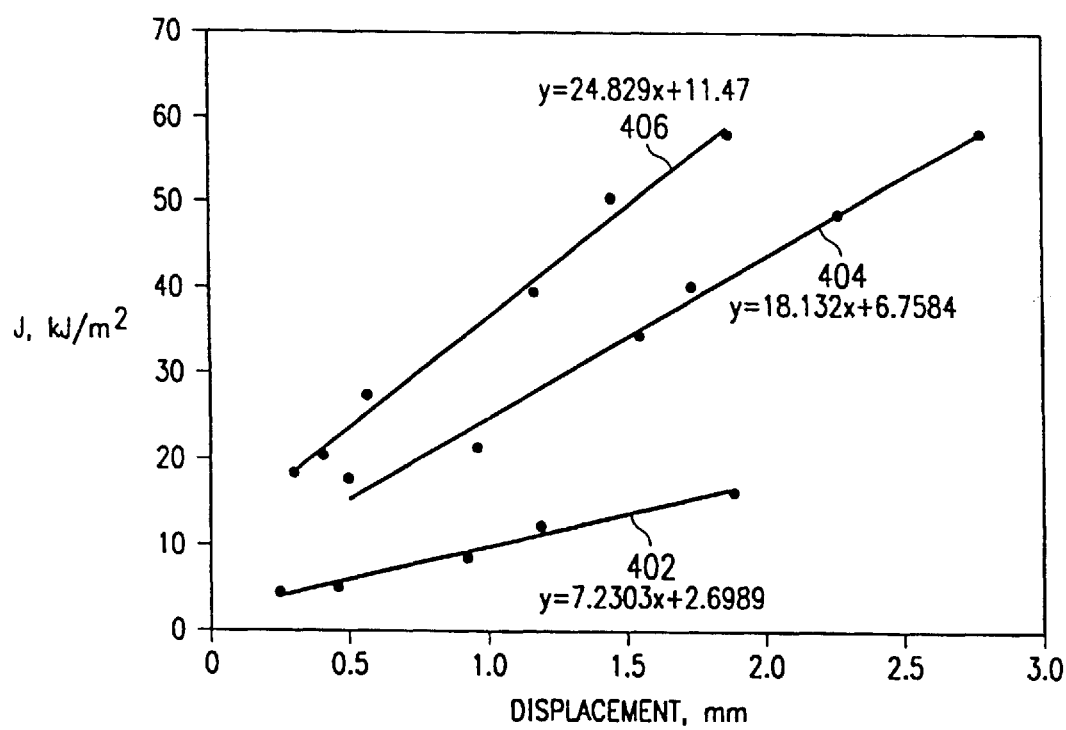
FIG. 4 is a graph illustrating the J-R curves of polypropylene modified in accordance with one embodiment of the present invention.

FIG. 4 is a graph illustrating the J-R curves of polypropylene modified in accordance with one embodiment of the present invention. The J values, which are computed from a function of the energy applied to a specimen, the specimen dimensions, and the crack length, were computed from measurements obtained using a screw-driven mechanical testing machine at a displacement rate of 2 mm/min. The graph shows the J-values as a function of the change in crack length, where the J-value is indicated on the y-axis and the crack length is indicated on the x-axis. The J-R curve of the neat PP 402 indicates that neat PP has a relatively low crack initiation resistance and crack propagation resistance. After a certain amount of stable crack propagation, crack instability occurs and the specimen breaks. The maximum J-value obtained is approximately 20.3 kJ/m$^2$. The J-R curve of the PP/NORYL-PX0844 blend 404 shows greatly improved fracture toughness. Addition of SEP further increase the toughness of the blend, as shown by the PP/NORYL-PX0844/SEP J-R curve 406. J-R curves 404 and 406 clearly show that NORYL-PX0844 blends have a much higher crack propagation resistance and crack initiation resistance than that of neat PP.

The damage zones of the specimens were analyzed. The damage zone of the neat PP specimen exhibited only limited crazing. Upon increasing the stress level, however, the crazes developed into cracks, indicating that the neat PP is prone to developing large cracks. In the PP/NORYL-PX0844 blend, massive crazing formed around the crack tip damage zone, appearing to initiate from and terminate at the NORYL-PX0844 particles. The NORYL-PX0844 particles act as stress concentrators to trigger crazes and stabilize the growing crazes, improving toughness. When the SEP rubber compatibilizer is added to the PP/NORYL-PX0844 blend, the PP/NORYL-PX0844/SEP specimen exhibited a high level of crazing and a large shear banding zone, indicating improved toughness.

TABLE 1 shows selected mechanical properties of neat PP and PP blends. Higher values of the Young's modulus, listed in column A, may indicate greater scratch resistance. The scratch depth, shown in column C, indicates the scratch resistance of the PP, where lower values correspond to greater scratch resistance. The $J_C$ values, listed in column D, indicate the toughness of the PP, where higher $J_C$ values correspond to tougher blends. The Izod impact strength, listed in column E, indicates impact resistance and was measured according to ASTM Standard ASTM D-256. Rows 3 and 6 describe PP/NORYL-PX0844 blends. The data shows improved modulus, scratch depth, $J_C$ values, and impact strength compared to those for the neat PP. Hence, the addition of NORYL-PX0844 improved both the toughness and the scratch resistance of the PP. Rows 4, 5, and 7 describe the PP/NORYL-PX0844/SEP blends. The data shows significantly improved $J_C$ and impact strength values compared to those for the neat PP, but slightly decreased modulus values. Hence, addition of SEP increased the toughness of the PP/NORYL-PX0844 blend significantly, with only a small drop in modulus.

TABLE 1

| | Material | A Young's Modulus (GPa) | B Yield Stress (MPa) | C Scratch Depth (30 N load) | D $J_C$ (kJ/M$^2$) | E Izod Impact Strength (J/m) |
|---|---|---|---|---|---|---|
| 1 | PP | 1.61 | 35.5 | 6.8 | 3.0 | 51.2 |
| 2 | PP/5% SEP | 1.42 | 29.0 | 5.7 | 12.8 | 77 |
| 3 | PP/10% NORYL-PX0844 | 1.79 | 30.5 | 6.7 | 14.5 | 53.5 |
| 4 | PP/10% NORYL-PX0844/2% SEP | 1.55 | 28.7 | 6.4 | 28.1 | 92.9 |
| 5 | PP/10% NORYL-PX0844/5% SEP | 1.41 | 30.0 | 7.5 | 19.2 | 133.3 |
| 6 | PP/20% NORYL-PX0844 | 1.90 | 29.4 | — | 9.7 | 59.4 |
| 7 | PP/20% NORYL-PX0844/5% SEP | 1.42 | 28.1 | 6.5 | 20.5 | 128.1 |

By adding a modifier and a compatibilizer, the present invention achieves both impact and scratch resistance in a polymeric system. The addition of a modifier increases the Young's modulus of the polypropylene and creates a blend with a stable morphology, contributing to scratch resistance. In the resultant polymer system, the modifier dissipates fracture energy in part by promoting crazing around crack tip damage zones to reduce the development of large cracks. The modified typically forms a particulate dispersion in the polymer phase, and under stress crazing develops around modifier particles. Moreover, the addition of a compatibilizer improves particle dispersion and interfacial adhesion, resulting in enhanced toughness. Consequently, the present invention increases the quality of polypropylenes, leading to advances in many industrial applications such as the automotive industry.

Although an embodiment of the invention and its advantages are described in detail, a person skilled in the art could make various alternations, additions, and omissions without departing from the spirit and scope of the present invention as defined by the appended claims.

What is claimed is:

1. A method for increasing the scratch resistance or toughness of polypropylene, the method comprising:
   providing a starting material comprising polypropylene;
   providing a modifier comprising polyphenylene oxide; and
   blending the modifier with the starting material to form a blend.

2. The method of claim 1, wherein the modifier further comprises polystyrene and rubber.

3. The method of claim 1, wherein the modifier is about 10% by weight to about 45% by weight of the blend.

4. The method of claim 1, wherein the modifier is about 10% by weight to about 25% by weight of the blend.

5. The method of claim 1, wherein the blend has a shear modulus of at least about 0.6 GPa.

6. The method of claim 1, further comprising adding a compatibilizer to the blend.

7. The method of claim 6, wherein the compatibilizer comprises a styrene-ethylene-propylene diblock copolymer.

8. The method of claim 6, wherein the compatibilizer comprises a diblock copolymer.

9. The method of claim 6, wherein the compatibilizer comprises a triblock copolymer.

10. The method of claim 6, wherein the compatibilizer comprises a random copolymer.

11. The method of claim 6, wherein the weight of the compatibilizer is about 0.5% to about 10% of the combined weight of the blend and compatibilizer.

12. The method of claim 6, wherein the weight of the compatibilizer is about 2% to about 5% of the combined weight of the blend and compatibilizer.

13. A polymer material blend made by a process, the process comprising:
   providing a starting material comprising polypropylene;
   providing a modifier comprising polyphenylene oxide; and
   blending the modifier with the starting material to form a polymer material blend.

14. The material of claim 13, wherein the modifier further comprises polystyrene and rubber.

15. The material of claim 13, wherein the modifier is about 10% by weight to about 45% by weight of the blend.

16. The material of claim 13, wherein the modifier is about 10% by weight to about 25% by weight of the blend.

17. The material of claim 13, wherein the blend has a shear modulus of at least about 0.6 GPa.

18. The material of claim 13, further comprising a compatibilizer.

19. The material of claim 18, wherein the compatibilizer comprises a styrene-ethylene-propylene diblock copolymer.

20. The material of claim 18, wherein the compatibilizer comprises a diblock copolymer.

21. The material of claim 18, wherein the compatibilizer comprises a triblock copolymer.

22. The material of claim 18, wherein the compatibilizer comprises a random copolymer.

23. The material of claim 18, wherein the weight of the compatibilizer is about 0.5% to about 10% of the combined weight of the blend and compatibilizer.

24. The material of claim 18, wherein the weight of the compatibilizer is about 2% to about 5% of the combined weight of the blend and compatibilizer.

* * * * *

UNITED STATES PATENT AND TRADEMARK OFFICE
CERTIFICATE OF CORRECTION

PATENT NO.   : 6,423,779 B1
DATED        : July 23, 2002
INVENTOR(S)  : H.J. Sue et al.

It is certified that error appears in the above-identified patent and that said Letters Patent is hereby corrected as shown below:

<u>Title page,</u>
Item [56], OTHER PUBLICATIONS, "A. Lustiger, C.N. Marzinsky and R.R. Muller" reference, "Spherulite Boundary Strengthening Concept for Toughening Polypro-lylene" delete "Polypro-lylene", and insert -- Polypropylene --.

Item [57], ABSTRACT,
Line 10, delete "stating" and insert -- starting --.

<u>Column 4,</u>
Lines 4 and 64, after "C", delete ".".

<u>Column 5,</u>
Lines 12 and 14, after "C", delete ".".

<u>Column 6,</u>
Line 13, after "load", delete "The load".

Signed and Sealed this

First Day of July, 2003

JAMES E. ROGAN
*Director of the United States Patent and Trademark Office*